Patented Nov. 9, 1948

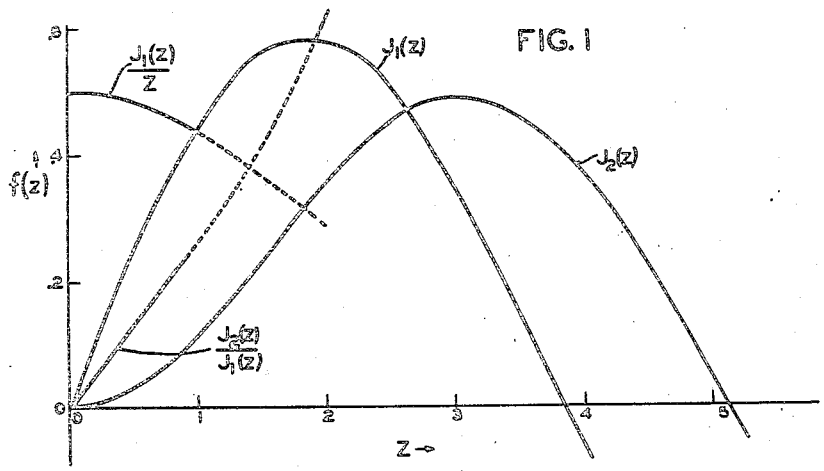
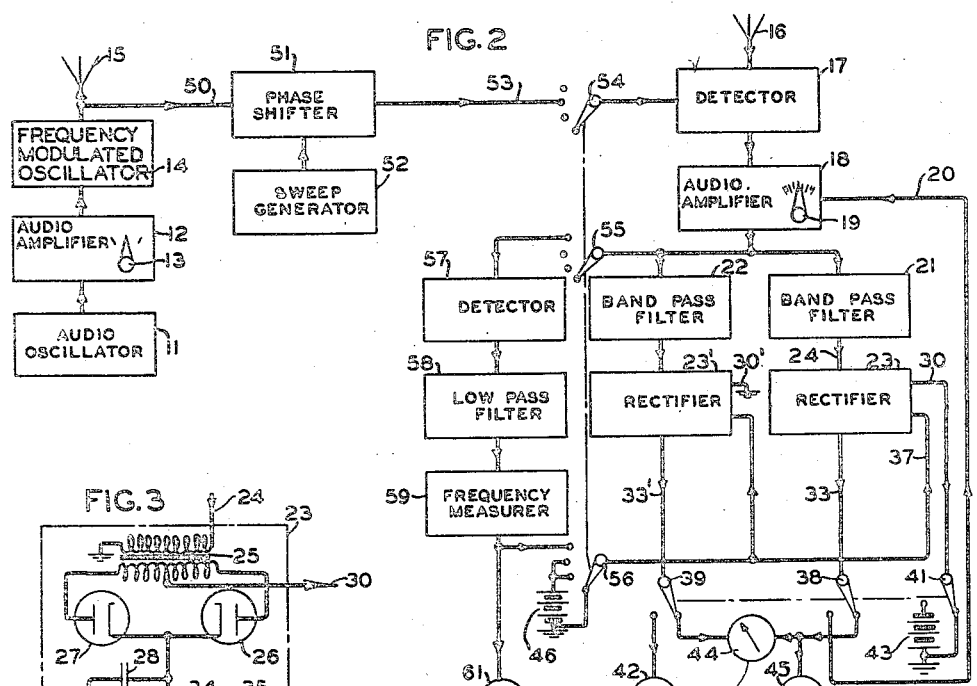
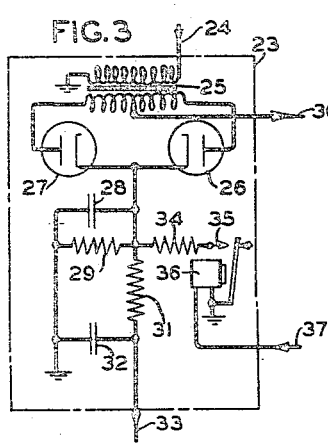

2,453,169

UNITED STATES PATENT OFFICE 2,453,169

RADIO GROUND CLEARANCE INDICATOR

Russell H. Varian, Garden City, N. Y., assignor to The Sperry Corporation, a corporation of Delaware Application April 10, 1943, Serial No. 482,648

20 Claims. (Cl. 343—14)

This invention relates, generally, to distance measuring and, more particularly, to continuous wave radio ground clearance indicators.

It is taught in the prior art that the distance to a reflecting surface or object may be determined by radiating a frequency-modulated radio wave toward the surface, receiving reflections of the wave therefrom, and comparing the reflected waves with waves received directly from the source of radiant energy. One method of comparison has been to apply the direct and reflected waves to a phase detector which measures the change of phase between the waves as the frequency is varied. The output signal of the phase detector has a frequency equal to that of the modulation signal and an amplitude proportional to the distance. Another method of comparison is to measure the frequency difference between direct and reflected waves to determine the distance. Yet another method of comparison is to provide a direct wave differing in average frequency from the reflected wave but frequency-modulated to a like degree. The combination of these waves results in an intermediate frequency wave which is also frequency-modulated. The extent of the resulting frequency modulation is measured to obtain a distance indication.

These systems require considerable complexity of high frequency apparatus. In the first and third systems, direct energy leakage from transmitter to receiver must be carefully reduced, while the second system suffers from poor discrimination against noise interference because of the relatively wide band of beat frequencies to be amplified. In the prior art, no provision has been made for the fact that, in general, the ground clearance of an aircraft is continuously changing, nor has the alteration of ground reflectivity with change in character of the terrain been determined as an aid to navigation.

It is, therefore, the principal object of the present invention to provide an improved radio distance measuring and ground clearance indicator of simplified design.

Another object lies in the provision of a radio apparatus that indicates distance to an object and/or ground clearance as a substantially linear function of the amplitude ratio of two signals resulting from the detection of a frequency-modulated wave received directly and after reflection from the ground.

Yet another object is to provide a distance measuring and/or radio ground clearance indicator having excellent discrimination against noise interference, a linear distance scale, and a range that may be readily adjusted by altering the maximum frequency deviation of the carrier wave.

A further object is to provide a radio ground clearance or distance indicator having a minimum of high frequency circuits.

A still further object is to provide an indication of ground reflectivity that is substantially independent of the ground clearance of an aircraft.

Another object is to provide a gradient meter indicating the time rate of change of terrain clearance.

Other objects will become apparent during the course of the following description and in the appended claims.

In the essential embodiment of the present invention an ultra high frequency radio wave is frequency-modulated at a low rate, and transmitted from a radiator mounted on an aircraft, marine or other craft and directed toward the ground or other object such as an obstruction. A wave collector, likewise mounted on the craft, is adapted to receive the transmitted energy after reflection from the ground or other object and supply it to a non-linear device, such as a crystal detector. The detector is also provided with the frequency-modulated wave over a substantially direct path, such as by leakage coupling between the radiator and the wave collector. The radiation path between the aircraft and the ground or other object introduces a time delay between the reflected and direct waves substantially proportional to the distance to the object or the ground clearance of the aircraft. The time delay results in amplitude modulation when the direct and reflected waves are combined in the detector. A plurality of low frequency waves are produced whose amplitudes vary with the time delay in an individually distinctive manner. The amplitude ratio of any two of these waves is dependent solely upon the time delay, all common factors being cancelled out. Therefore, this ratio is determined and utilized as a measurement of distance or ground clearance. The theoretical aspects of the present invention may be better understood by reference to the following paragraphs.

It can be shown that the output of the detector contains low frequency waves corresponding to the fundamental or first harmonic and higher harmonics of the modulation signal. The peak amplitudes of these harmonics may be expressed as follows:

$$I_k = A J_k\left[2\frac{\Delta f}{f_c}\sin\left(\frac{2\pi f_c h}{C}\right)\right]\sin(2\pi f_0 T) \quad (1)$$

for odd harmonics, and $$I_k = AJ_k\left[2\frac{\Delta f}{f_s}\sin\left(\frac{2\pi f_s h}{C}\right)\right]\cos(2\pi f_0 T) \quad (2)$$

for even harmonics.
Where:

$I_k$ = peak current amplitude of the $k$th harmonic wave.
$A$ = parameter proportional to the amplitudes of direct and reflected carrier wave and to the curvature of the detector.
$f_s$ = modulation signal frequency.
$f_0$ = average carrier frequency.
$\Delta$ = maximum frequency deviation.
$h$ = ground clearance or distance to object.
$C$ = propagation velocity of radiation.
$T = \frac{2h}{C}$ = difference in time delay between the two paths.
$J_k[\ ]$ = $k$th order Bessel function of the quantity within the brackets.

It is observed that because of the factors $\sin(2\pi f_0 T)$ and $\cos(2\pi f_0 T)$ in the expressions for peak amplitudes of the odd and even harmonics, these peak amplitudes are themselves maximized or minimized according to the value of the time delay T. The peak amplitudes of the odd harmonics are greatest and the even harmonics disappear when T is equal to an odd number of quarter periods of the average carrier frequency, while the peak amplitudes of the even harmonics are greatest and the odd harmonics disappear when T is equal to an even number of these quarter periods. When the clearance between the aircraft and the ground or other object is altered by a quarter-wavelength of the average carrier wave, the peak amplitudes of all harmonic waves achieve or pass through a maximum value. A substantially constant variation in distance or ground clearance causes the peak amplitudes to be maximized and minimized at a rate proportional to the time rate of change of distance or ground clearance, that is, proportional to what is hereinafter termed the "gradient." This is equivalent to the production of upper and lower side-frequencies centering on these harmonic frequencies. In one form of the present invention these side-frequencies are supplied to a detector, and the resulting heterodyne frequency is measured to indicate the gradient.

Now if we consider only the maximum peak amplitudes of the signal harmonics or associated side-frequencies, the sine and cosine factors in Equations 1 and 2, respectively, are then equal to unity and these equations reduce to:

$$\hat{I}_k = AJ_k\left[2\frac{\Delta f}{f_s}\sin\left(\frac{2\pi f_s h}{C}\right)\right] \quad (3)$$

where $\hat{I}_k$ = maximum of the peak current amplitude of either odd or even $k$th harmonic or associated frequencies. Since a sine function is substantially equal to its argument for low values thereof, if $$\frac{2\pi f_s h}{C}$$

is maintained sufficiently small the above equation may be replaced by:

$$\hat{I}_k = AJ_k\left[\frac{4\pi\Delta f h}{C}\right] \quad (4a)$$

or $$\hat{I}_k = AJ_k(z) \quad (4b)$$

Where:

$$z = \frac{4\pi\Delta f h}{C}$$

Recalling that the first order Bessel function varies linearly with small arguments, the second order Bessel function starts out quadratically, and in general the $n$th order Bessel function commences to increase according to the $n$th power of the argument, the ratio of one Bessel function to the next lower function is seen to be substantially proportional to $z$ for small values thereof. Thus it is contemplated to determine the ratio of the maximum peak amplitudes of one harmonic wave to the next lower harmonic wave to obtain a quantity that is substantially proportional to the ground clearance of the aircraft. An indicating means is made to respond linearly to this quantity; consequently ground clearance is indicated in a linear manner.

Since the parameter A in Equation 4b is proportional to the amplitude of the reflected carrier wave, which is in turn directly proportional to the ground reflectivity and inversely proportional to the ground clearance, the maximum peak amplitude of the first harmonic wave may be expressed as:

$$\hat{I}_1 = \frac{rBJ_1(z)}{h} \quad (5a)$$

which, for values of $z$ less than, say, ½, is approximately equal to:

$$\hat{I}_1 = rB\frac{2\pi\Delta f}{C} \quad (5b)$$

where:

$\hat{I}_1$ = maximum peak current amplitude of first harmonic wave,
$B$ = parameter proportional to amplitude of the direct carrier wave and to the curvature of the detector,
$r$ = ground reflectivity including losses caused by ground resistance, capacitance, and scattering effects.

It is therefore contemplated to determine an approximate value for ground reflectivity by measuring the maximum peak amplitude of the first harmonic of the modulation signal.

The features of the invention will become more apparent in connection with the following detailed description of the illustrated embodiment thereof, together with the accompanying drawings, wherein:

Fig. 1 is an illustrative graph,
Fig. 2 is a block schematic diagram of an embodiment of the present invention, and
Fig. 3 is a schematic wiring diagram of a detail of the structure shown in Fig. 2.

Referring now to Fig. 2, an audio oscillator 11 of any conventional design provides a wave of constant frequency and amplitude to the input circuit of an audio amplifier 12. The amplifier 12 may employ negative feedback in the well-known manner to insure stable operation, and has a gain control indicated at 13 with which the ouput amplitude of the impressed audio wave may be altered. This control is employed to change the range of the ground clearance indication, as will be hereinafter disclosed.

An ultra high frequency modulated oscillator 14 is adapted to be frequency-modulated by the output wave from amplifier 12. Modulated oscillator 14 is designed to produce a substantially pure frequency-modulated carrier wave whose frequency deviation is preferably strictly proportional to the amplitude of the applied modulation signal. This frequency-modulated wave is transmitted from a radiator 15, which may be made directive in order to increase the radiant efficiency of the system for directing at an object or to minimize the area of the terrain over which the ground clearance determination is averaged.

A portion of the frequency-modulated energy is fed over a line 50 to an ultra high frequency phase shifter 51. This phase shifter may conveniently comprise an electron beam velocity modulation amplifier of the type having an input cavity resonator and an output cavity resonator only coupled by an electron beam. The flight time of the electrons in the beam is made variable by alteration of the beam acceleration voltage. A sweep generator 52 provides a voltage in series with the normal beam acceleration potential for periodically varying the velocity of the electrons in a substantially linear manner, thus introducing a desired time delay between the two resonators. A line 53 from the output resonator of the phase shifter 51 is connected to an ultra high frequency detector 17 through switching means symbolized by a four-position switch 54. The circuit is closed in the upper-middle switch position and opened in the other positions.

A receiving antenna 16 similar to radiator 15 is adapted to collect such energy as is returned to the aircraft after reflection from the ground and also energy allowed to leak directly from the radiator 15. The antenna 16 is connected to the ultra high frequency detector 17 where the direct and reflected energies are combined. As has been explained above, the output of the detector 17 contains harmonics of the frequency of the audio oscillator 11.

A high gain audio amplifier 18 is connected to the output of the detector 17. The amplifier 18 has a substantially level frequency-amplification characteristic over the range between the lowest side-frequency of the first audio harmonic and the highest side frequency of the second audio harmonic created by the gradients normally encountered in aircraft operation. The amplification may be varied by manual gain control 19 or by an automatic volume control voltage provided over a lead 20 in a manner subsequently described in detail. The output circuit of the amplifier is connected to band pass filters 21 and 22 and also through a four-position switch 55 to a detector 57. This latter circuit is closed in the top switch position and opened in the other positions. A low pass filter 58 interconnects the detector 57 with a frequency measurer 59. The frequency measurer comprises a well-known electronic circuit adapted to provide an output voltage substantially proportional to the impressed frequency. A meter 61 indicates the frequency-controlled voltage amplitude and may conveniently be calibrated in terms of feet per minute gradient.

Band pass filter 21 is adapted to transmit only a relatively narrow band of frequencies surrounding the first audio harmonic wave while band pass filter 22 is designed to pass a corresponding frequency band grouped around the second audio harmonic wave. The output circuits of filters 21 and 22 are connected to similar rectifiers 23 and 23' respectively, a possible form of which is shown in detail in Fig. 3.

Referring to Fig. 3, an input lead is indicated at 24 for applying the wave to be rectified to the primary winding of an input transformer 25 having a center-tapped secondary winding which connects to the plates of two diodes 26 and 27 in phase opposition. A lead 30 attached to the center-tap of the transformer 25 provides means for introducing a negative potential on the diode plates if voltage delayed rectification is desired. The cathodes of tubes 26 and 27 are connected to a load comprising a capacitor 28 and a resistor 29 connected in parallel and constituting an extremely long time delay network. Further filtering is provided by a resistor 31 and a capacitor 32 connected in series across the load. An output lead 33 is attached to the junction of the resistor 31 and the capacitor 32. A resistor 34 having a considerably smaller value than resistor 29 is attached between the high potential side of the load and a contact 35 of a relay 36. The relay 36 is arranged to contact 35 to ground when the relay winding is energized by a control voltage introduced over a lead 37.

Output leads 33 and 33' of rectifiers 23 and 23', respectively, connect to two-position switches 38 and 39, respectively. Center-tap lead 30 emerging from rectifier 23 connects to a two-position switch 41 while corresponding lead 30' is brought out of rectifier 23' to ground. Switches 38, 39 and 41 are ganged so as to be simultaneously operable. The left position of these switches joins lead 33' to a meter 42, lead 33 to the automatic volume control lead 20, and lead 30 to a negative potential source 43. The right position of these switches connects lead 33' to one winding of a ratio type meter 44, lead 33 to the second winding of meter 44 and also to a meter 45, and lead 30 to ground.

Meters 42 and 44 may be calibrated in feet for indicating distance at an object or ground clearance, and meter 45 may be graduated in percentage of ground reflectivity, as will become apparent as the description proceeds. Meter 44 is a well-known permanent-magnet moving-coil instrument whose accuracy is independent of impressed voltage within certain limits. The ratio effect is secured by proper adjustment of the angle between the moving coil windings, and the scale distribution is determined by the shape of the core.

The control lead 37, common to both rectifiers, is attached to a four-position switch 56 which is ganged with similar switches 54 and 55. The top position of switch 56 joins the control lead 37 to the output circuit of frequency measurer 59, the two middle positions connect to a positive potential source 46, and the bottom position is grounded.

The basic mode of operation of the present invention is best explained with the switches 54, 55 and 56 connected to their bottom positions and switches 38, 39 and 41 thrown to the right, as illustrated in Fig. 2. Frequency-modulated waves are transmitted from radiator 15 having a rate of frequency variation determined by the frequency of audio oscillator 11, and an extent of frequency variation determined by the setting of the gain control 13 on the amplifier 12.

Leakage radiation and radiation reflected from the terrain below the aircraft or from an object are received by the antenna 16 and conveyed to the detector 17. The detector 17 causes the direct and time-delayed waves to beat together to produce harmonics of the frequency of audio oscillator 11. The maximum peak amplitudes of all these audio waves are proportional to the amplitudes of the direct and reflected components of the ultra high frequency wave and to the characteristics of the detector 17. The ground acts roughly like a mirror and the strength of the reflected ultra high frequency carrier wave impinging on the antenna 16 is substantially that which would be received if the radiator 15 were situated at the mirror image of the aircraft and directed toward the antenna 16. This means that the strength of the reflected wave varies substantially inversely with the ground clearance or object distance. The amplitude of each audio wave is, however, furthermore proportional to a particular function of the ground clearance or object distance.

Fig. 1 illustrates graphs of the individual manner in which the amplitudes of the first and second audio harmonic waves vary with ground clearance. Distances along the vertical axis are proportional to amplitude and distances along the horizontal axis are proportional to ground clearance. Curve $J_1(Z)$ indicates the amplitude variation of the first harmonic wave, while curve $J_2(Z)$ indicates the amplitude variation of the second harmonic wave.

These audio waves are equally amplified in the amplifier 18 and then separated by filters 21 and 22 with the result that the first harmonic wave is rectified by rectifier 23 and the second harmonic wave is rectified by the similar device 23'. The time constant of the rectifier load circuits, comprising capacitors 28 and resistors 29, is such that the output voltage is substantially proportional to the maximum peak amplitudes of the audio waves, irrespective of any apparent constancy of ground clearance. Since the maximum peak amplitudes of these waves occur whenever the aircraft alters its ground clearance by one-quarter of the ultra high frequency carrier wavelength, it is evident that the capacitors 28 are recharged by exceptionally small changes of relative distance.

The direct currents from rectifiers 23 and 23' flow through the high impedance ratio meter 44 which therefore indicates a reading proportional to the ratio of the respective amplitudes of the two audio waves. This meter may be isolated from the rectifiers by buffer amplifiers if it is desired to reduce further the current requirements from the capacitors 28.

It seems evident that all factors which influence the amplitude of both audio waves in a similar way can have no effect on this meter reading. Thus, the indication must be proportional to the ratio of the particular amplitude curve $J_2(Z)$ of the second harmonic wave and the corresponding curve $J_1(Z)$ of the first harmonic wave. This ratio is illustrated in Fig. 1 by a substantially straight line $$\frac{J_2(Z)}{J_1(Z)}$$

Since Z is defined by $$\frac{4\pi \Delta f h}{C}$$

the ratio meter 44 may be provided with a plurality of substantially linear ground clearance scales one for each adjustment of the extent of frequency modulation swing. For example if the signal frequency is 1,000 cycles, modulation frequency swings of 5,000, 50,000 and 500,000 cycles may be employed for clearances from the ground to 15,000, 1,500 and 150 feet, respectively. Upon inspecting the graph of $$\frac{J_2(Z)}{J_1(Z)}$$

it is seen that excellent linearity between amplitude and ground clearance is obtained for values of Z equal to less than one-half, while improved sensitivity and fair linearity is afforded by values of Z up to about two. However, the sensitivity of the radio system is ample even when small frequency-modulation swings are employed because the increase in strength of the reflected radio wave at low ground clearances tends to compensate for the reduction in the audio amplitudes due to the shape of the $J_1(Z)$ and $J_2(Z)$ curves.

The reflectivity meter 45 is also supplied with current from rectifier 23. The amplitude of this current is proportional to the reflected carrier wave and to the $J_1(Z)$ curve. Since it has been shown that the strength of the carrier wave is inversely proportional to the ground clearance and Z is proportional to the ground clearance, the current amplitude may be conveniently illustrated in Fig. 1 by the graph $$\frac{J_1(Z)}{Z}$$

It is seen that for small values of Z the reading of meter 45 is substantially independent of ground clearance, and therefore the meter scale may be calibrated in terms of ground reflectivity. This indication of reflectivity is a considerable aid in navigation, since it enables a pilot to distinguish easily between land and water while flying during overcast weather conditions.

Another mode of operation is obtained by throwing switches 38, 39 and 41 to the left. The gain control 19 on amplifier 18 is turned to the position of highest amplification. The negative potential from source 43 prevents any rectification in rectifier 23 below a predetermined amplitude of the first harmonic wave. All rectified voltage is fed back over the automatic volume control line 20 to reduce the gain of the amplifier 18. Since the available gain of the amplifier is very high, only the slightest feed-back voltage is necessary to maintain the audio output wave supplied to the rectifier 23 substantially equal to the potential source 43. The amplification factor of amplifier 18 is, therefore, closely equal to the amplitude of the potential of source 43 divided by the amplitude of the first audio wave. The second harmonic wave is subjected to the same amplification; consequently the meter 42 is supplied a current which is proportional to the ratio of the second and first harmonics, and serves to indicate the aircraft ground clearance.

When the aircraft is appreciably altering its ground clearance, the large time constant incorporated in rectifiers 23 and 23' may cause an undesirable lag in the meter readings. Under these conditions the switch 56 may be thrown to the lower-middle position to energize the relays 36 by connecting control leads 37 to the potential source 46. The relays connect resistors 34 in parallel with resistors 29 and thus reduce the time constant of the rectifier loads to a low value. This prevents any lag in response of meter 42 or 44 and, at the same time, the aircraft's relative motion assures that true maximum peak ratios are being measured.

One method of eliminating the need for the manual control referred to above is by placing switches 54, 55 and 56 in their upper-middle positions. The ultra high frequency periodic phase shifter 51 supplies a wave to the detector 17 which homodynes with the reflected wave picked up by the antenna 16. The audio frequencies resulting from this process are shifted in phase at the periodicity of the sweep generator 52. The audio waves are amplified and rectified as before, but now the time delays in rectifiers 23 and 23' may be maintained short by continuously energizing relays 36 because the audio waves are being constantly swept through the maximum peak amplitudes, irrespective of the aircraft's motion relative to ground.

A further mode of operation obtains when switches 54, 55 and 56 are placed at their top positions. It has been pointed out that sidefrequencies of the harmonic waves are produced when there is a perceptible gradient or time rate of change of terrain clearance. The side-frequencies are allowed to beat together in the detector 57 to produce a lower frequency which is proportional to the gradient. The low pass filter 58 transmits only this latter frequency and attenuates the original side-frequencies. The frequency measurer 59 is actuated by the gradient frequency and feeds a current to the gradient meter 61 that is dependent upon this frequency and substantially independent of its amplitude.

Gradient readings are especially useful as aids in identifying invisible terrain by changes in slope registered when the barometric altitude and airspeed of the aircraft are constant. The output current of the frequency measurer 59 also acts to energize the relays 36 when the gradient is sufficient to insure correct operation of the meter 42 or 44 with the short time delays in rectifiers 23 and 23'. It is to be understood that the long time delay networks are only employed when the gradient is substantially zero; consequently under no conditions can there be a lag in the ground clearance indication.

Relays 36 are merely symbolic of time delay control means, and it may be desirable to employ any well known servo system which alters the value of an adjustable resistor corresponding to resistor 34 in proportion to the output voltage of the frequency measurer 59, and thus provide a simple means for varying the time delay in proportion to the gradient.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A method of measuring distance comprising the steps of transmitting a wave, varying the frequency of said wave, receiving said wave directly and after reflection from an object whose distance is to be measured, beating together the direct and reflected waves to produce signals having amplitudes that vary according to different functions of the time delay between said waves, and indicating said distance as a function of the amplitude ratio of two of said signals.

2. A method of measuring distance comprising the steps of transmitting a wave, varying the frequency of said wave, receiving said wave directly and after reflection from an object whose distance is to be measured, periodically phase shifting said directly received wave, combining the direct and reflected waves to produce signals having frequencies dependent upon the rate of variation of the transmitted wave and upon the character of said phase shifting, and indicating said distance as a function of the amplitude ratio of two of said signals.

3. A method of measuring distance comprising the steps of generating a frequency modulated wave, radiating a portion of the energy of said wave, periodically phase shifting another portion of the energy of said wave, receiving said phase shifted wave directly and said radiated wave after reflection from an object whose distance is to be measured, combining said direct and reflected waves to produce low frequency waves in accordance with the modulation frequency and with the character of said phase shifting, providing a signal proportional to the amplitude ratio of two of said lower frequency waves, and indicating said distance as a function of said signal amplitude.

4. A method of measuring distance comprising the steps of generating a frequency modulated wave, radiating a portion of the energy of said wave, periodically phase shifting another portion of the energy of said wave, receiving said phase shifted wave directly and said radiated wave after reflection from an object whose distance is to be measured, combining the direct and reflected waves to produce lower frequency waves in accordance with the modulation frequency and with the character of said phase shifting, proportionally amplifying two of said lower frequency waves by an extent necessary to raise one of said waves to a substantially constant predetermined amplitude, and determining said distance by measuring the amplitude of the other of said amplified waves.

5. Distance measuring apparatus comprising means for generating a radio frequency wave, means for frequency modulating said wave at a lower frequency, means for radiating said wave, means for receiving said wave directly and after reflection from an object whose distance is to be measured, means for combining said direct and reflected waves to produce sidebands centering on harmonics of said lower frequency, amplitude ratio means for providing a signal proportional to the average amplitude ratio of the sidebands centering on two of said harmonics, and means for indicating said distance as a function of said signal amplitude.

6. Distance measuring apparatus comprising means for generating a radio frequency wave, means for frequency modulating said wave at a lower frequency, means for radiating said wave, means for receiving said wave directly and after reflection from an object whose distance is to be measured, means for combining said direct and reflected waves to produce sidebands grouped around harmonics of said lower frequency, and means for indicating said distance as a function of the amplitude ratio of the sidebands grouped around two of said harmonics.

7. Distance measuring apparatus comprising means for generating a radio frequency wave, means for frequency modulating said wave at a lower frequency, means for radiating said wave, means for receiving said wave directly and after reflection from an object whose distance is to be measured, means for combining said direct and reflected waves to produce sidebands grouped around harmonics of said lower frequency, and amplitude ratio means for providing a signal proportional to the amplitude ratio of the sidebands grouped around two of said harmonics.

8. Distance measuring apparatus as defined in claim 6 including means for periodically phase shifting said directly received wave.

9. Distance measuring apparatus as defined in claim 7 including means for periodically phase shifting said directly received wave.

10. Distance measuring apparatus as defined in claim 7 wherein said amplitude ratio means comprises amplifier means for proportionally amplifying said sidebands, and means for controlling the amplification of said amplifier means to maintain the ouput amplitude of one set of said sidebands substantially constant, thus modifying the output amplitude of the other sidebands in proportion to said ratio.

11. A method of determining ground reflectivity from an aircraft comprising the steps of generating a frequency modulated wave, radiating said wave toward the ground, receiving said wave directly and after reflection from the ground, combining said direct and reflected waves to produce a wave having a frequency substantially independent of the ground clearance of said aircraft and measuring the amplitude of said last mentioned wave.

12. Means for determining ground reflectivity from an aircraft comprising means for generating a radio frequency wave, means for frequency modulating said wave at a lower frequency, means for radiating said wave toward the ground, means for receiving said wave directly and after reflection from the ground, detector means for combining said direct and reflected waves to produce a wave having an amplitude and frequency substantially independent of the ground clearance of said aircraft, and means for measuring said amplitude to obtain an indication substantially proportional to the ground attenuation.

13. In a radio ground clearance indicator of the character described in claim 6, means for indicating the time rate of change of ground clearance comprising means for detecting the frequency difference between said sidebands and said respective harmonics of said lower frequency, means for measuring said frequency difference, and means for indicating said rate in accordance with said frequency difference.

14. Distance measuring apparatus comprising means for generating a radio frequency wave, means for frequency modulating said wave at a lower frequency, means for radiating said wave, means for receiving said wave directly and after reflection from an object whose distance is to be measured, means for combining said direct and reflected waves to produce signals having frequencies substantially harmonically related to said lower frequency, and means for indicating said distance as a function of the amplitude ratio of two of said signals.

15. Distance measuring apparatus comprising means for generating a radio frequency wave, means for frequency modulating said wave at a lower frequency, means for radiating said wave, means for receiving said wave directly and after reflection from an object whose distance is to be measured, means for combining said direct and reflected waves to produce sidebands centering on harmonics of said lower frequency, and means responsive to the relative amplitude of said sidebands for indicating the distance of said object.

16. A method of measuring distance comprising the steps of transmitting a wave, varying the frequency of said wave, receiving said wave directly and after reflection from an object whose distance is to be measured, combining the direct and reflected waves to produce signals having frequencies substantially independent of said distance, and indicating said distance in response to the amplitude ratio of two of said signals.

17. In a method of measuring the distance to a reflecting surface by radiating frequency modulated waves toward the surface and by mixing waves received after a fixed time delay with those received after reflection from said surface to produce beat-notes, the step comprising indicating said distance in response to the amplitude ratio of two of said beat-notes.

18. Distance measuring apparatus comprising means for generating a radio frequency wave, means for frequency modulating said wave at a lower frequency, means for radiating said wave, means for receiving said wave directly and after reflection from an object whose distance is to be measured, means for beating said direct and reflected waves to produce signals having amplitudes that depend in distinctive ways upon the time delay between said waves, and amplitude ratio means for providing a signal proportional to the amplitude ratio of two of said first-mentioned signals.

19. Distance measuring apparatus comprising means for generating a radio frequency wave, means for frequency modulating said wave at a lower frequency, means for radiating said wave, means for receiving said wave directly and after reflection from an object whose distance is to be measured, means for beating said direct and reflected waves to produce signals having amplitudes that depend in distinctive ways upon the time delay between said waves, and means responsive to the relative amplitude of two of said signals for indicating the distance of said object.

20. Distance measuring apparatus comprising means for generating a radio frequency wave, means for frequency modulating said wave at a lower frequency, means for radiating said wave, means for receiving said wave directly and after reflection from an object whose distance is to be measured, means for beating said direct and reflected waves to produce signals having amplitudes that depend in distinctive ways upon the time delay between said waves, and means for indicating said distance as a function of the amplitude ratio of two of said signals.

RUSSELL H. VARIAN.

REFERENCES CITED

The following references are of record in the file of this patent:

UNITED STATES PATENTS

| Number | Name | Date |
|---|---|---|
| 2,206,896 | Higgins et al. | July 9, 1940 |
| 2,247,662 | Newhouse | July 1, 1941 |
| 2,253,975 | Guanella | Aug. 26, 1941 |
| 2,257,830 | Wolff et al. | Oct. 7, 1941 |
| 2,268,587 | Guanella | Jan. 6, 1942 |
| 2,268,643 | Crosby | Jan. 6, 1942 |

Certificate of Correction

Patent No. 2,453,169.

November 9, 1948.

RUSSELL H. VARIAN

It is hereby certified that errors appear in the printed specification of the above numbered patent requiring correction as follows:

Column 3, line 13, for "Δ" read $\Delta f$; column 5, line 35, for the word "again" read *gain*; column 6, line 14, before "contact" insert *connect*; line 33, for "distance at" read *distance to*;

and that the said Letters Patent should be read with these corrections therein that the same may conform to the record of the case in the Patent Office.

Signed and sealed this 21st day of June, A. D. 1949.

[SEAL]

THOMAS F. MURPHY,
*Assistant Commissioner of Patents.*